United States Patent
Mancini et al.

[11] Patent Number: 6,048,134
[45] Date of Patent: Apr. 11, 2000

[54] AUTOMATIC ASPIRATOR AIR CONTROL SYSTEM

[75] Inventors: Alfonso R. Mancini, Penfield; Richard A. Williams, Savannah; Ronald E. Hess, Webster, all of N.Y.

[73] Assignee: Xerox Corporation, Stamford, Conn.

[21] Appl. No.: 09/004,473

[22] Filed: Jan. 8, 1998

[51] Int. Cl.[7] .................................................. B09B 3/00
[52] U.S. Cl. ........................ 405/128; 166/267; 166/370; 210/747
[58] Field of Search ..................................... 405/128, 129, 405/131; 588/249; 166/370, 266, 267, 67, 75.1; 210/747

[56] References Cited

U.S. PATENT DOCUMENTS

| | | | |
|---|---|---|---|
| 4,844,797 | 7/1989 | Wells | 210/104 |
| 5,050,676 | 9/1991 | Hess et al. | 166/267 |
| 5,147,530 | 9/1992 | Chandler et al. | 210/90 |
| 5,172,764 | 12/1992 | Hajali et al. | 166/267 |
| 5,173,092 | 12/1992 | Rudder | 405/52 X |
| 5,197,541 | 3/1993 | Hess et al. | 166/67 |
| 5,358,357 | 10/1994 | Mancini et al. | 405/128 |
| 5,373,897 | 12/1994 | Skarvan | 166/53 |
| 5,380,125 | 1/1995 | Croy | 405/128 |
| 5,441,365 | 8/1995 | Duffney et al. | 405/128 |
| 5,464,309 | 11/1995 | Mancini et al. | 405/258 |
| 5,509,757 | 4/1996 | Croy | 405/128 |
| 5,622,450 | 4/1997 | Grant | 166/370 X |

*Primary Examiner*—Dennis L. Taylor
*Attorney, Agent, or Firm*—Aditya Krishnan

[57] ABSTRACT

A method and apparatus for sustaining optimum fluid entrainment conditions in a contaminant extraction well is disclosed. More specifically, the present invention includes a central controller which communicates with a pressure detector and an aspiration control source that are connected to a contaminant extraction well. The central controller causes aspiration air to flow into or out of the extraction well based upon the vacuum level that has been measured by the pressure detector. This system enables the vacuum to be maintained at a predetermined level, and allows the well to operate as changes occur in the groundwater content of the area in which the well is operating.

20 Claims, 4 Drawing Sheets

AUTOMATIC ASPIRATOR AIR CONTROL SYSTEM

This invention relates generally to a process and apparatus for removing residual contaminants from liquid, and more particularly concerns automatic aspiration air controller which continuously sustains optimum vacuum conditions in a contaminant extraction well. The well can be used to remove contaminated liquids and vapors from the ground.

BACKGROUND OF THE INVENTION

The 2-PHASE™ (a trademark of the Xerox Corporation) extraction process provides a method and apparatus for removing chemicals and other undesirable substances from a contaminated area of the ground. Generally speaking, an extraction well or the like is placed within the affected area and a vacuum is applied to draw soil vapors and groundwater into the well. Application of the vacuum to the soil vapor initiates a high velocity vapor stream at the bottom of the well, entraining the contaminated groundwater and soil gas. Both phases are then lifted to the surface as a single two-phase stream. The liquid and vapor are then separated, and each phase is treated to remove contaminants. Such processes are disclosed in U.S. Pat. No. 5,464,309 (Mancini 309), U.S. Pat. No. 5,441,365 (Duffney), U.S. Pat. No. 5,358,357 (Mancini 357), U.S. Pat. No. 5,197,541 (Hess 541), U.S. Pat. No. 5,172,764 (Hajali), and U.S. Pat. No. 5,050,676 (Hess 676), all assigned to Xerox Corporation, Stamford, Conn.

Contaminants can be found in subsurface soil and groundwater, in the liquid or vapor phase. They can exist as discrete substances, or they can be mixed with and/or dissolved in groundwater and soil vapors. Such contaminants can be found in the vadose zone (the unsaturated layer that lies between the surface of the earth and the water table), at the interface between the vadose zone and the water table, and in the saturated zone below the water table.

Many industrial and commercial facilities and waste handling and disposal sites contain both soil and groundwater contamination. A variety of techniques have been used for removal of contaminants and remediation of affected media. One common technique entails the excavation and off-site treatment of the soil. Another technique entails saturating the contaminated soil with water in situ, causing the contaminants to be leached slowly from the soil by the water. The contaminated water can then be removed.

One very effective technique for removing chemicals from a contaminated area of the ground involves removal of soil contaminants using the 2-PHASE™ extraction process. The process generally involves providing a borehole in the contaminated area, placing an extraction well inside of the borehole, and applying a vacuum to the well such that vapors and liquid can be drawn from the soil. The liquid and vapor are transported to the surface simultaneously as a two-phase stream. After it reaches the surface, the liquid-vapor stream is separated into two independent streams. Each stream is then treated for removal of the contaminants.

Various types of contaminants may be removed from the ground using a process such as two phase extraction. An effluent stream may include organic and inorganic substances, as well as those that are soluble, insoluble, volatile, and non-volatile. The various classes of contaminants are subjected to post-extraction treatment to remove them from the vapor or liquid in which they reside. Suitable post-extraction treatment processes for contaminant removal typically, but not necessarily include filtration, adsorption, air stripping, settling, flocculation, precipitation, scrubbing and the like.

The process described above is a very effective technique for removing volatile and water soluble chemicals from a contaminated area of the ground. However, during the normal course of operation events often occur which alter the height of the water table, and adversely affect operation of the well. For example, as seasonal changes occur the amount of groundwater present in a given area will often vary as snow melts, or excessive heat causes the ground to dry.

Since the volume of contaminated effluent extracted from sub-surface soil varies with the groundwater content, the ratio of entrainment air to groundwater must be manipulated manually or the vacuum being applied to the effluent stream will not lift it from the ground. More specifically, when excess groundwater is present, the anti-gravitational force being applied by the vacuum may be too low to lift the effluent from beneath the ground. Similarly, when the ground is dry the excess soil gas results in greater air flow within the extraction well. The increase in the flow of air causes the vacuum to fluctuate which makes well operation inefficient.

Generally speaking, it is best to keep the bottom of the extraction well at or very near the liquid-vapor interface in order to continuously entrain the suspended liquid within the extracted air stream. The 2-PHASE™ process is most efficient when the ratio of vapor to liquid maximizes the vacuum that is applied to the extraction well. Fluctuations in groundwater levels and changes in groundwater flow to the well cause this ratio to vary throughout well operation. This variation in the vapor to liquid ratio requires the flow of entrainment air to be continuously adjusted in order to maintain application of the optimum vacuum to the extraction well. For example, if the liquid-vapor interface drops below the bottom of the well, the amount of air being supplied to the well must be decreased to maintain the vacuum condition. Once groundwater levels rise, the air supply must be increased to optimize the vacuum or the extraction well will again operate inefficiently.

Thus, entrainment air must be adjusted as the groundwater level fluctuates if optimal vacuum delivery to the well formation is to be maintained, and efficient operation of the extraction well is to continue. The vacuum within the well is maintained by supplying atmospheric air through an inlet as the level of groundwater increases. As the groundwater level drops, the air supply is cut-off. The current method of operation requires a technician or other maintenance person to physically travel out to the well site, and inspect the hardware to see if the well is operating properly. If the liquid is no longer being entrained, the technician must manually supply a gas fluid to the well to restart it. While compressed air is often supplied, any suitable gas including those at or below atmospheric pressure and those at above or below ambient temperature may be provided. The inlet must then be manually adjusted to vary the flow of gas therethrough (the air) once the well begins to operate. Because a failure will not be detected until a physical inspection of the hardware is performed, the well may be inoperable for extensive periods of time. It is desirable to provide a way to automatically direct and regulate the amount of air that is applied to the well and extraction tube, as changes to the surrounding groundwater level take place. The present invention provides such means, thereby eliminating the need for human intervention and the costs and inconvenience associated with it.

The following disclosures may be relevant to various aspects of the present invention:

U.S. Pat. No. 5,464,309 to Mancini et al. issued Nov. 7, 1995 discloses certain aspects of the 2-PHASE™ extraction process for removing volatile organic chemicals from a contaminated area of the ground. A borehole is placed in the contaminated area to a depth below the water table, and a plurality of concentric pipes are placed in the borehole. Gas and a vacuum are simultaneously applied to the pipe system such that contaminated vapors and liquid are drawn from the soil into the pipes. The vapors and liquids are transported to the surface together and separated into two components. Each stream is treated to remove the contaminants. An apparatus for carrying out the process is also disclosed.

U.S. Pat. No. 5,373,897 to Skarvan issued Dec. 20, 1994 discloses a pneumatic underground fluid recovery pump that includes a power actuated inlet valve and a power source, independent of the static fluid pressure head in the well, for actuating the power actuated inlet valve between open and closed positions. Also disclosed is a pneumatic underground fluid recovery pump that includes a fluid level sensor for sensing fluid level in the pump reservoir above a first predetermined level and a controller for controlling the pressurization of the pump in response to the fluid level sensor sensing fluid level above the first predetermined level. Also disclosed is a pneumatic underground fluid recovery pump that includes a fluid level tracking device for sensing underground fluid level in the well and adjusting the level of the pump inlet valve a predetermined distance below the underground fluid level in the well.

U.S. Pat. No. 5,358,357 to Mancini et al. issued Oct. 25, 1994 discloses a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams.

U.S. Pat. No. 5,172,764 to Hajali et al. issued Dec. 22, 1992 discloses a process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams. Also disclosed is an apparatus for carrying out the process.

U.S. Pat. No. 5,147,530 to Chandler et al. issued Sep. 15, 1992 discloses a well water removal and treatment system including a pumping and well water withdrawal loop consisting of an above ground pump, a pressurized water drive line from the pump outlet to a well water ejector, a water return line from the well water ejector to an aeration and precipitation tank, an inlet line from the aeration and precipitation tank to the pump and a venturi nozzle air mixing manifold fluidically connected between the high pressure drive water line and the lower pressure water delivery line to mix air into the water during the entire pump cycle. The water delivery line from the pumping and withdrawal loop has a flow control regulator therein that controls the water flow therethrough in proportion to the water pressure in the pumping and withdrawal loop above a preselected minimum control level. Until the water pressure exceeds the minimum control level, the water repeatedly cycles through the pumping and withdrawal loop and thereafter most of the water repeatedly cycles through the loop until the pump is deactuated.

U.S. Pat. No. 4,844,797 to Wells issued Jul. 4, 1989 discloses a vacuum extraction system in which one or more vacuum extraction vessels are suspended in one or more well bores and each is connected to a vacuum pump. In one embodiment, each extraction vessel has a vessel chamber, a top inlet port with an adjustable metering valve, a vent pipe, a liquid level sensor in the vessel chamber, and an outlet port connected to the vacuum pump through a controller. The controller responds to the level of liquid in the vessel chamber to connect and disconnect each of the outlet ports of each of the extraction vessels to and from the vacuum pump. The controller also activates and deactivates the vacuum pump. In another embodiment, the extraction vessel is suspended for reciprocation in the well bore in order to skim liquid hydrocarbons floating on the ground water. In another embodiment, the extraction vessel has a differentiation valve in its bottom which releases water, but not liquid hydrocarbons, when the extraction vessel is lifted free of the liquid in the well.

U.S. application Ser. No 08/919,966 filed Aug. 28, 1997 by Salotti et al. as a continuation of application Ser. No. 08/606,785 filed Feb. 27, 1995 discloses an air flow control circuit which includes a conduit having a first end and a second end, each end defining an aperture through which air may pass. The first end of the conduit is located inside an inner wall of a riser pipe, and outside an outer wall of a vacuum extraction pipe such that air may move from the conduit into the vacuum extraction pipe. A check valve assembly is situated in the conduit between an inlet to the riser pipe and an opening in the vacuum extraction pipe.

All of the references cited herein are incorporated by reference for their teachings.

Accordingly, although known apparatus and processes are suitable for their intended purposes, a need remains for processes and apparatus for pre-treating contaminated liquids and gases obtained from soil with increased efficiency. Further, there is a need for processes and apparatus for enhancing the concentration of volatile contaminants in the gas phase of an effluent mixture, thereby decreasing the concentration of contaminants in the liquid phase.

SUMMARY OF THE INVENTION

In accordance with the invention, there is provided an apparatus for continuously maintaining a vacuum level throughout a vacuum chamber, wherein the vacuum chamber is located inside a tube and has a bottom opening inside of the tube, and wherein a pressure differential exists between the vacuum chamber and the tube, the apparatus including: an inlet defined by a wall of the tube, through which air may pass; a flow controller communicating with the inlet to vary a flow rate and direction of air through the inlet and into and out of the tube; a pressure detector communicating with the vacuum chamber to measure a vacuum level therein; and a central controller communicating with the flow controller and with the pressure detector to receive the pressure detector measurement and to cause the flow controller to operate in response to the pressure detector measurement.

In accordance with another aspect of the invention there is provided an apparatus for removing effluent from the ground in a two-phase stream including: a perforated riser pipe extending downwardly from the surface of the ground to a level below the water table, the perforated riser pipe defining an aspiration air inlet; a vacuum extraction pipe situated inside of the riser pipe and having an opening situated within the perforated riser pipe; a vacuum inducing device communicating with the vacuum extraction pipe to draw soil vapors and groundwater from the ground into the riser pipe, and from the riser pipe to the vacuum extraction pipe to transport the effluent to the surface as the two-phase stream; and an aspiration air control system which maintains the vacuum within the vacuum extraction pipe at a predetermined level throughout system operation.

In accordance with yet another aspect of the invention there is provided a method of removing effluent from the ground in a two-phase stream including: placing a perforated riser pipe in a borehole in the ground to a level below the water table, wherein the perforated riser pipe defines an aspiration air inlet; placing a vacuum extraction pipe inside of the riser pipe, wherein the vacuum extraction pipe has an opening situated within the perforated riser pipe; applying a vacuum to the vacuum extraction pipe to draw soil vapors and groundwater from the ground into the riser pipe, and from the riser pipe to the vacuum extraction pipe to transport the effluent to the surface as the two-phase stream; and operating an aspiration air control system to maintain the vacuum within the vacuum extraction pipe at a predetermined level throughout system operation.

The present invention has significant advantages over current methods and apparatus for removing contaminated effluent from the ground. Notably, it maintains the optimum vacuum level as various changes in the groundwater content of the area surrounding the well take place. Maintaining this vacuum prevents the well from shutting down as the system attempts to remove more or less groundwater during seasonal and other changes. The present invention enables the well to continue to operate as these changes take place, without requiring human intervention for repeated adjustment of the flow of aspiration air to the well.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for automatically adjusting the flow of air to a contaminant extraction well to provide for continuous optimization of the vacuum being applied to the well throughout its operation.

Figure 1:
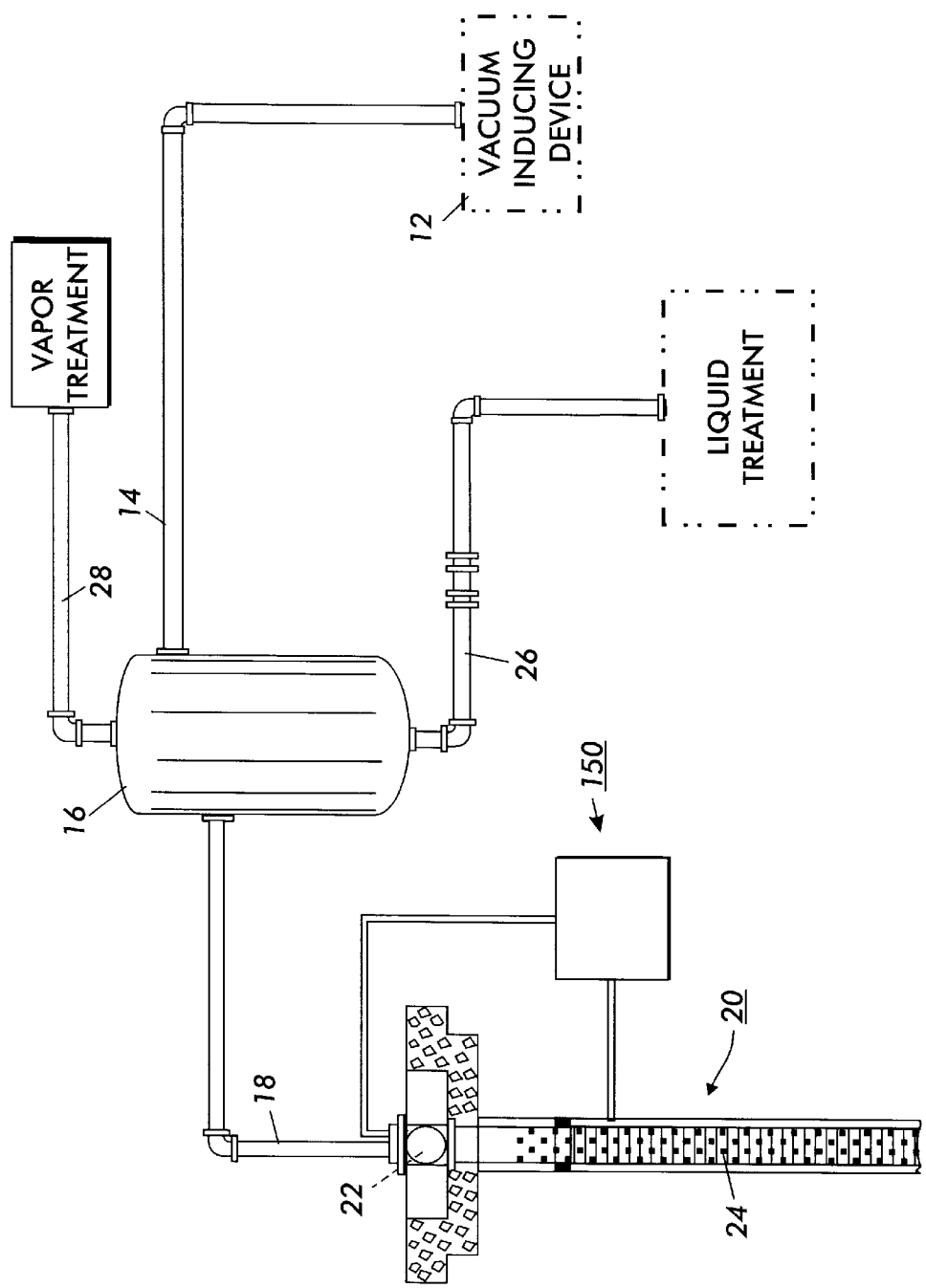
FIG. 1 is a schematic representation of a contaminant extraction process and apparatus which may be used to remove soil contaminants from below the surface of the ground.

Referring now to the drawings where the showings are for the purpose of describing an embodiment of the invention and not for limiting same, FIG. 1 illustrates schematically an apparatus for practicing a known method of treating soil liquids and vapors containing contaminants. A vacuum inducing device 12 is in fluid communication through a pipe 14, vapor-liquid phase separator 16 such as a knock-out pot or similar device, and pipe 18 with the pipe fitting 22 to one or more extraction wells 20.

In a typical two-phase contaminant extraction process, activation of vacuum inducing device 12 draws both soil vapor and groundwater into an extraction well. Application of the vacuum to the soil vapor generates a high velocity vapor stream which entrains the groundwater causing both portions to be lifted to the surface together as a two-phase effluent stream 24. Two-phase effluent stream 24 is then drawn through pipe 18 and into phase separator 16, where it is separated into a liquid portion and a vapor portion. The separated portions are then removed from phase separator 16 via pipes 26 and 28 for disposal or subsequent filtering or other treatment.

With continued reference to FIG. 1, in one embodiment of the invention extraction well 20 includes a perforated riser pipe 102 which extends downwardly from the surface of the ground to a depth below the static groundwater level. A vacuum extraction pipe 104 is placed inside of riser pipe 102, and vacuum inducing device 12 applies a vacuum to extraction pipe 104 to draw soil vapors and groundwater from the ground into riser pipe 102 and into vacuum extraction pipe 104, to transport the two-phase stream to the surface. While the invention is described here in conjunction with a system that has a vacuum extraction pipe 104 placed inside riser pipe 102, those skilled in the art will recognize that the invention can be used with a system that requires placement of the riser pipe inside of the vacuum extraction pipe, or with a system in which the pipes are not concentrically placed at all.

Notably, the present invention includes an aspiration air control system 150, which may be added to a two-phase contaminant extraction system such as that described above. In the preferred embodiment, aspiration air control system provides for continuous optimization of the vacuum inside extraction well 20, thereby enabling vacuum inducing device 12 to efficiently and continuously lift effluent stream 24 from beneath the ground.

Figure 2:
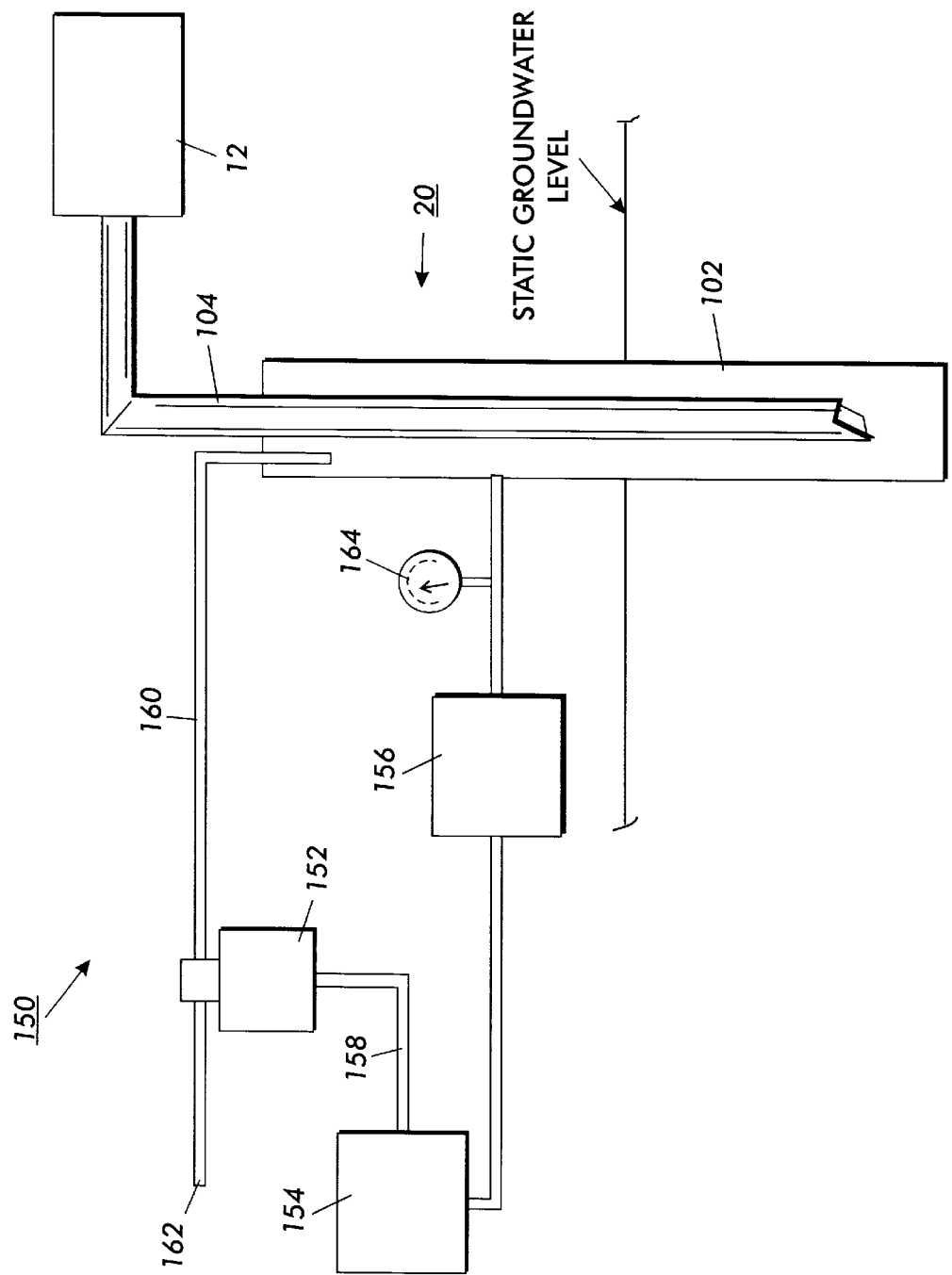
FIG. 2 contains a detailed illustration of one embodiment of the aspiration air control system of the present invention.

Referring now to FIG. 2 in one embodiment of the invention, aspiration air control system 150 includes a flow controller 152, a central controller 154, and a pressure detector 156, all communicating via line 158. In addition, flow controller 152 communicates with inlet 162 in extraction well 20 to enable aspiration air to pass into and/or out of extraction well 20.

In a typical 2-PHASE contaminant extraction system vacuum inducing device 12 continuous to apply a vacuum at a constant level. While the vacuum level chosen provides an adequate extraction force at start up, subsequent variations in the amount of groundwater in the area surrounding the well often renders the initial vacuum level unacceptable for continued operation. More specifically, while substantially all of the vacuum being applied by vacuum inducing device 12 is applied to the top of the well, that which actually reaches the fluid column beneath the surface of the earth is at a substantially reduced level. While this vacuum level reduction can be accounted for in determining the initial requirements for the strength of vacuum inducing device 12, later changes in groundwater content of the surrounding area will often cause the system to perform below the desired level and in some circumstances, to shut down entirely. The present invention eliminates this problem by allowing the initially applied vacuum level to be maintained deep within the well regardless of the amount of groundwater that resides in the neighboring area.

For example when the amount of groundwater increases, such as during heavy rain periods or after snow melt during the spring months, the initially applied vacuum will usually be too weak to lift effluent stream 24 from the ground. Alternatively when the surrounding groundwater drops below its initial level, as during a drought or in the summer months, the excess vapor (which has been drawn into the well from the soil and is therefore not under vacuum) diminishes the vacuum inside of the well. To prevent the entire system from failing during conditions such as these, air may be drawn into or out of the well through inlet 162. When the groundwater level is high, aspiration air is added to the well to entrain the groundwater column and increase the upward velocity of the groundwater particles, thereby assisting the diminished vacuum in lifting effluent stream 24 from the ground. When the groundwater level is low, excess air is removed to re-establish the vacuum for efficient lifting of effluent stream 24.

Unfortunately, known methods of introducing or removing aspiration air from the well require human intervention to measure the level of vacuum actually being applied to the effluent stream, and to open or close the port that exhausts or introduces the air. The present invention automates this process by providing for continuous varying of the amount of air in the well, and thus eliminating the vacuum losses that can occur to cause the system to fail.

With continued reference to FIG. 2, pressure detector 156 is attached to extraction well 20 to measure the vacuum level inside in perforated riser pipe 102 during well operation. While not required, a gauge 164 or a similar device may be associated with pressure detector 156 to provide a visible read-out of this vacuum level.

As indicated above, at start up the vacuum inducing device 12 applies a vacuum that has been determined based primarily upon the amount of groundwater that is present, or that will typically be present at the location in which the well resides. Pressure detector 156 provides continuous measurements of the vacuum level in riser pipe 102. The measurements that are provided by pressure detector 156 may be electrical or electronic signals, as well as optical, mechanical or other types of data. One example of a suitable device is a Pressure Transducer, model PR-262 manufactured by Mamac Systems, Minneapolis, Minn. While this device is known to be acceptable when used with the present invention, pressure detector 156 may be any apparatus that is capable of continuously measuring the vacuum level inside extraction well 20, and the invention is not limited to this embodiment.

Still referring to FIG. 2, the measurement data provided by pressure detector 156 is transmitted to central controller 154, which will process it and determine whether the vacuum inside extraction well 20 is at an acceptable level. Central controller 154 adjusts the flow of externally supplied air through an air flow control device as will be described below to vary the vacuum level when necessary. Central controller 154 may be any device that is capable of transmitting flow control data in response to pressure measurement data that has been received from pressure detector 156. One device that is known to successfully operate within a 2-PHASE contaminant extraction system is the Metasys Lab and Central Plant Controller manufactured by Johnson Controls, Inc. While this is known to be an acceptable device, it merely provides for one embodiment of the present invention and the invention is not limited to its use. As the groundwater level varies, central controller 154 reads the measurement data that has been received from pressure detector 156 and determines when the vacuum level inside riser pipe 102 is too low to lift the two-phase stream from beneath the earth's surface. When the vacuum is too low, central controller 154 communicates with flow controller 152 to allow for the addition or removal of air from the inside of extraction well 20.

Flow controller 152 may be any device that is capable of enabling and inhibiting the flow of aspiration air into and out of said extraction well 20. In one embodiment of the invention, flow controller 152 is an electronic valve such as an AV-8020 Series Electrically-Actuated Floating Control Valve, manufactured by Johnson Controls, Milwaukee, Wis. In addition, in the preferred embodiment of the invention, the air that passes through flow controller 152 will be atmospheric air. However, the invention is not limited to this embodiment, and air at an increased or decreased pressure or temperature may be transported through flow controller 152.

With continued reference to FIG. 2, an additional consideration for the present invention is that although extraction well 20 is operating as long as at least some contaminants are being removed from the ground, it may not always be operating in the most efficient manner. Application of a vacuum below that which is applied by vacuum inducing device 12, will result in the removal of effluent as long as the lowered vacuum exceeds the force required to lift the amount of groundwater that is present inside the well. However, operating the well under a these conditions is a highly inefficient way to remove effluent stream 20 from the ground. Thus, the present invention should also be used when the well would otherwise operate under less than optimum conditions.

The optimum vacuum level is applied to the underground stream when the optimum air to groundwater ratio is supplied to extraction well 20. For purposes of this invention, the most efficient well operation will occur by optimizing the amount of aspiration air that is supplied for a given volume of groundwater. More specifically, the optimum ratio of aspiration air to groundwater is that which will minimize the differential between the vacuum being applied by vacuum inducing device 12 and that which exists at inside of the well as described above. While it is difficult, if not impossible, to completely eliminate this pressure differential, the optimum aspiration air to groundwater ratio is that which will minimize it. This optimum ratio will vary, depending upon the volume of groundwater being extracted from the ground and the diameter of the extraction well.

Figure 3A:
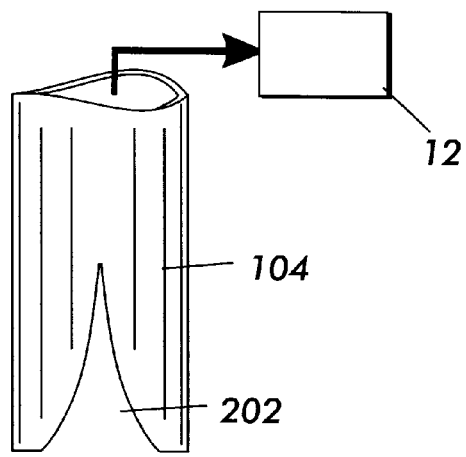
FIGS. 3A, 3B, 3C depict a ogive shaped slots cut into the bottom of a vacuum extraction tube.

Performance of the present invention can be further enhanced if one or more slots 202 are cut into the bottom of extraction well 20. In one embodiment of the invention, slots 202 which have arch or "ogive" shapes are embedded into the circumference of vacuum extraction pipe 104 as shown in FIG. 3A. While the embodiment of the invention that has an ogive shape is described here, slots which have other shapes, for example vertical, semi-circular, or triangular may also be useful and the invention is not limited to the use of an ogive design. In any event, the addition of slots having ogive shapes allows the groundwater flow to remain laminar or at least close to laminar regardless of the rate at which the groundwater flows toward extraction well 20.

Figure 3B:
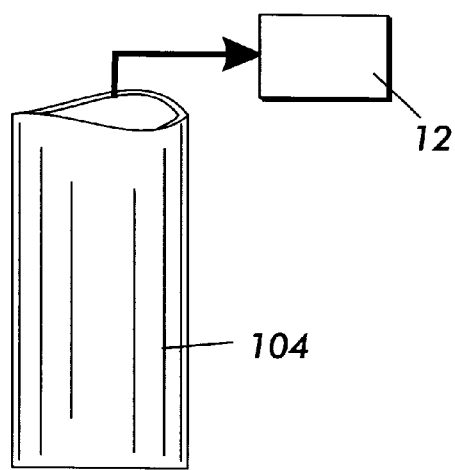
Figure 3C:
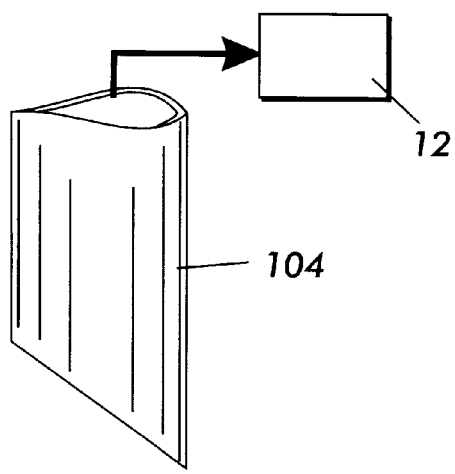

Groundwater that moves toward extraction well 20 may include molecules that move at a high rate of speed. When the bottom of extraction well 20 is flat as shown in FIG. 3B or at an angle as illustrated in FIG. 3C, the rapidly moving particles exhibit highly turbulent flow as they enter vacuum extraction pipe 104. This turbulent flow can cause large fluctuations in the pressure that is measured by pressure detector 156 until the flow in the tube transitions to a smooth state, resulting in the transmission of false data to central controller 154, and undesired aspiration air flow through flow controller 152.

Addition of ogive slots 202 to the bottom of vacuum extraction pipe 104 can alleviate this problem. The ogive shape is capable of accommodating high speed as well as low speed flow. More specifically, the narrow section at the top of ogive slot 202 is best for accommodating the groundwater flowing at relatively low rates. Alternatively, the wider section toward the bottom of the ogive slot 202 is acceptable for receiving groundwater moving at a high rate of speed. When ogive slots are added to the bottom of vacuum extraction pipe 104, the smooth transition from the wide section to the narrow section allows water molecules moving at a wide variety of flow rates to all enter the tube smoothly, thus eliminating turbulent flow at the bottom of vacuum extraction pipe 104 and the undesirable pressure fluctuations that are associated with it.

Figure 4:
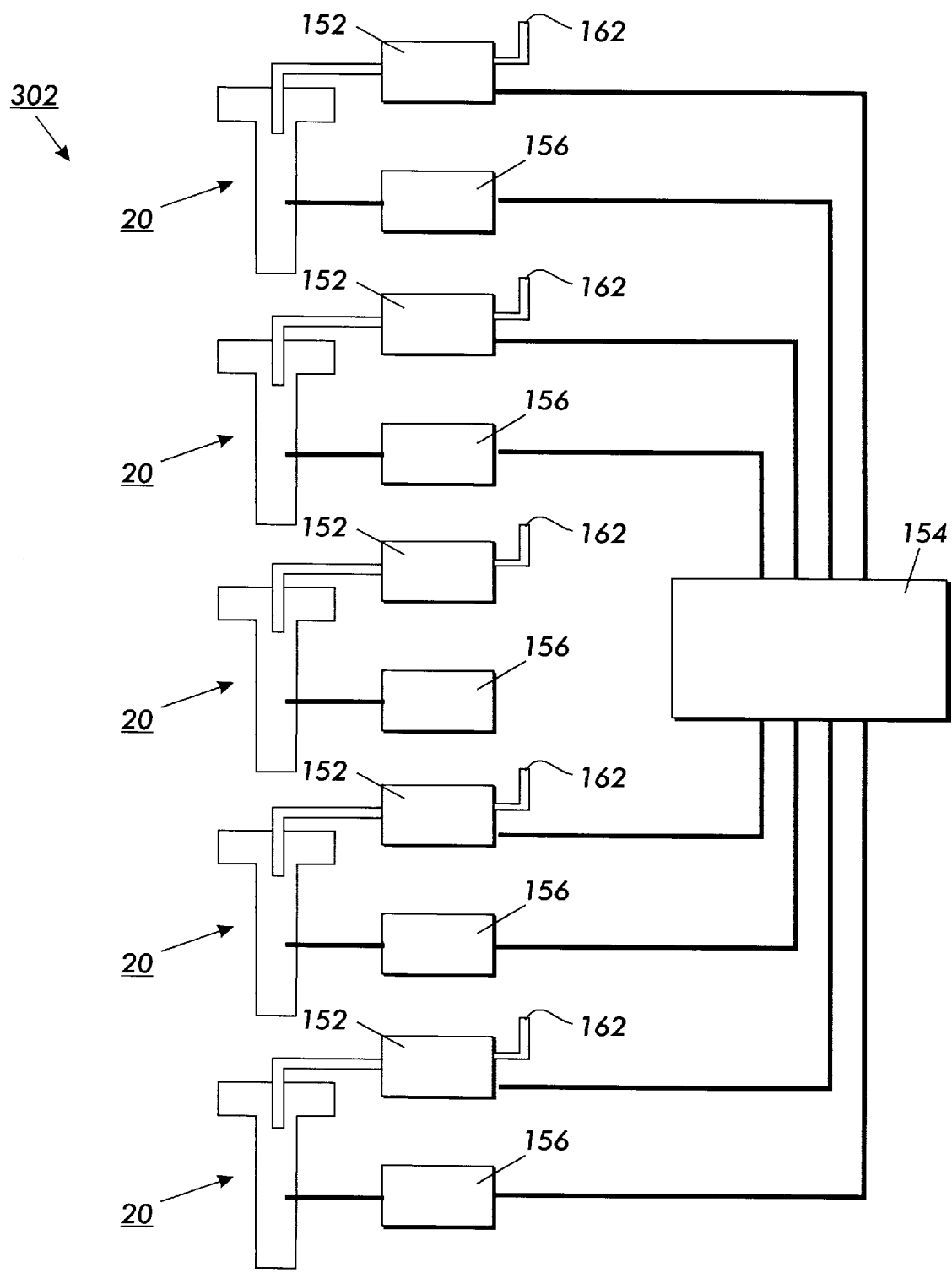
FIG. 4 is a schematic diagram illustrating an embodiment of the present invention in which several extraction wells are connected together to remove contaminated effluent from the ground.

Referring now to FIG. 4, another embodiment of the invention includes a group 302 of extraction wells 20, each well having an associated pressure detector 156 which communicates with a single central controller 154. In this embodiment, central controller 154 may then communicate with all associated flow controllers 152 to facilitate the flow of aspiration air into one or more appropriate extraction wells 20. This embodiment of the invention will obviously be very useful when more than one well has been installed in a given location. Use of a single central controller 154 will allow efficient contaminant extraction throughout the area, without requiring extensive amounts of computer or other control equipment. However when desired, a single central controller 154 may be used with each extraction well 20 in order to maintain independent control of the flow of aspiration air into each well.

It is, therefore, apparent that there has been provided in accordance with the present invention, a process and apparatus for removing volatile contaminants from liquid that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for continuously maintaining a vacuum level throughout various depths in a vacuum chamber, wherein the vacuum chamber is located inside a tube and has a bottom opening inside of the tube, and wherein a pressure differential exists between the vacuum chamber and the tube, comprising:
   a) an inlet defined by a wall of the tube, through which air may pass;
   b) a flow controller communicating with said inlet to vary a flow rate of said air through said inlet and into said tube;
   c) a pressure detector communicating with the vacuum chamber to measure a vacuum level therein; and
   d) a central controller communicating with said flow controller and with said pressure detector to receive said pressure detector measurement and to cause said flow controller to operate in response to said pressure detector measurement.

2. An apparatus for continuously maintaining a vacuum level as claimed in claim 1 wherein said pressure detector is a device capable of continuously measuring a vacuum level inside said vacuum chamber.

3. An apparatus for continuously maintaining a vacuum level as claimed in claim 2 wherein said pressure detector is an electronic pressure transducer.

4. An apparatus for continuously maintaining a vacuum level as claimed in claim 1 wherein said flow controller is capable of enabling, inhibiting and varying a flow rate of aspiration air into and out of said tube.

5. An apparatus for continuously maintaining a vacuum level as claimed in claim 4 wherein said flow controller is an electrically actuated floating control valve.

6. An apparatus for continuously maintaining a vacuum level as claimed in claim 1 wherein said central controller transmits flow control data in response to pressure measurement data received from said pressure detector.

7. An apparatus for continuously maintaining a vacuum level as claimed in claim 1 wherein a bottom of said vacuum chamber has an ogive shape.

8. An apparatus for removing effluent from the ground in a twophase stream comprising:
   a) a perforated riser pipe extending downwardly from the surface of the ground to a level below the water table, said perforated riser pipe defining an aspiration air inlet;
   b) a vacuum extraction pipe situated inside of said riser pipe and having an opening situated within said perforated riser pipe;
   c) a vacuum inducing device communicating with said vacuum extraction pipe to draw soil vapors and groundwater from the ground into said riser pipe, and from said riser pipe to said vacuum extraction pipe to transport said the effluent to the surface as the two-phase stream; and
   d) an aspiration air control system which maintains said vacuum within said vacuum extraction pipe at a predetermined level throughout system operation.

9. An apparatus for removing effluent from the ground as claimed in claim 8 wherein said aspiration air control system further comprises:
   a) a pressure detector which measures a vacuum level within said vacuum extraction pipe;
   b) a flow controller communicating with an air source to vary a flow of aspiration air into said riser pipe; and
   c) a central controller communicating with said flow controller and with said pressure detector to receive said pressure detector measurement and to cause said flow controller to vary said aspiration air flow in response to said pressure detector measurement.

10. An apparatus for removing effluent from the ground as claimed in claim 9 wherein said pressure detector is a device capable of continuously measuring a vacuum level inside said vacuum extraction pipe.

11. An apparatus for removing effluent from the ground as claimed in claim 10 wherein said pressure detector is an electronic pressure transducer.

12. An apparatus for removing effluent from the ground as claimed in claim 9 wherein said flow controller is capable of enabling, inhibiting and varying a flow rate of aspiration air into and out of said riser pipe.

13. An apparatus for removing effluent from the ground as claimed in claim 12 wherein said flow controller is an electrically-actuated floating control valve.

14. An apparatus for removing effluent from the ground as claimed in claim 9 wherein said central controller transmits flow control data in response to pressure measurement data received from said pressure detector.

15. An apparatus for removing effluent from the ground as claimed in claim 9 wherein a bottom of said vacuum extraction pipe has an ogive shape.

16. An apparatus for removing effluent from the ground as claimed in claim 9 wherein said aspiration air control system communicates with a plurality of effluent extraction wells to independently maintain a vacuum within each extraction well at a predetermined level throughout system operation.

17. An apparatus for removing effluent from the ground as claimed in claim 16 wherein:
   a) a separate pressure detector is associated with each vacuum extraction pipe to measure a vacuum level therein; and
   b) a separate flow controller is associated with each riser pipe to vary a flow of aspiration air from said source.

18. An apparatus for removing effluent from the ground as claimed in claim 17 wherein a single central controller communicates with a each flow controller and with each associated pressure detector to receive said pressure detector measurements and to cause said associated flow directors to vary a flow of aspiration air in response to said pressure detector measurements.

19. A method of removing effluent from the ground in a two-phase stream comprising:
   a) placing a perforated riser pipe in a borehole in the ground to a level below the water table, said perforated riser pipe defining an aspiration air inlet;
   b) placing a vacuum extraction pipe inside of said riser pipe, said vacuum extraction pipe having an opening situated within said perforated riser pipe;
   c) applying a vacuum to said vacuum extraction pipe to draw soil vapors and groundwater from the ground into said riser pipe, and from said riser pipe to said vacuum extraction pipe to transport said effluent to the surface as the two-phase stream; and
   d) operating an aspiration air control system to maintain said vacuum within said vacuum extraction pipe at a predetermined level throughout system operation.

20. A method of removing a effluent from the ground as claimed in claim 19 wherein said aspiration air control system operation step further comprises:
   a) determining an optimum vacuum level for said vacuum extraction pipe;
   b) continuously measuring a vacuum level within said vacuum extraction pipe; and
   c) varying a flow of aspiration air into said riser pipe by varying a flow rate of aspiration air into said perforated riser pipe in response to said vacuum level measurement.

* * * * *